United States Patent [19]
Hanyuda et al.

[11] Patent Number: 4,727,448
[45] Date of Patent: Feb. 23, 1988

[54] SHUTDOWN CONTROL CIRCUIT FOR AN ELECTRIC POWER SUPPLY

[75] Inventors: Ken Hanyuda, Midori; Michimasa Ohara, Nakahara, both of Japan

[73] Assignee: Fujitsu Limited, Kawasaki, Japan

[21] Appl. No.: 863,879

[22] Filed: May 16, 1986

[30] Foreign Application Priority Data

May 21, 1985 [JP] Japan ............................... 60-108764

[51] Int. Cl.[4] ............................................... H02H 7/10
[52] U.S. Cl. ....................................... 361/18; 361/91; 361/92; 361/93; 363/51
[58] Field of Search ....................... 361/18, 79, 86, 87, 361/91, 92; 363/50, 51; 323/269, 271

[56] References Cited

U.S. PATENT DOCUMENTS

| | | | |
|---|---|---|---|
| 3,509,448 | 4/1970 | Bland | 323/269 |
| 3,796,919 | 3/1974 | Johnson | 361/79 |
| 3,992,659 | 11/1976 | Ekstrom | 363/51 |
| 4,208,691 | 6/1980 | Rogowsky | 361/79 |
| 4,216,517 | 9/1983 | Takahashi | 361/79 |
| 4,352,136 | 9/1982 | Erickson | 361/79 X |
| 4,403,213 | 9/1983 | Khamare | 361/79 X |

FOREIGN PATENT DOCUMENTS 2152395 12/1971 France .

*Primary Examiner*—Philip H. Leung
*Assistant Examiner*—H. L. Williams
*Attorney, Agent, or Firm*—Staas & Halsey

[57] ABSTRACT

A control circuit for shutting down a constant-current supply suitable for a double-end feeding power supply system for a long-haul wire telecommunication system. The shutdown control circuit includes a voltage detecting circuit, a current detecting circuit and an AND gate. The voltage and current detecting circuits provide detection signals when the constant-current supply provides an output voltage greater than a predetermined voltage value and the current at the output terminal is less than a predetermined current value. The predetermined voltage and current values are determined to correspond to a load circuit input resistance at which the supply of a current by the constant-current supply is to be shut down. Thus, the shutdown condition of the constant-current supply can be determined free from the dropping characteristic of the constant-current supply, and the withstand voltages required for the circuit components and the assemblage thereof for the constant-current supply and the electronic equipment fed by the current supply, can be reduced. The same basic concept is also applied to constant-voltage supplies connected in parallel to each other and to a load circuit.

14 Claims, 14 Drawing Figures

SHUTDOWN CONTROL CIRCUIT FOR AN ELECTRIC POWER SUPPLY

BACKGROUND OF THE INVENTION

The present invention relates to an electric power supply system, and more particularly to an improvement in the control circuit for shutting down a constant-current supply for a wire telecommunications system operated in a double-end feeding mode.

In a long-haul wire telecommunications system, for example, an underwater cable transmission system, a number of repeaters between the terminal stations are supplied with electric power from constant-current supplies installed at one or both of the terminal stations. These two modes of power supply are referred to as double-end feeding and single-end feeding, respectively. General discussions on the configuration and operation of the constant-current supplies in a double-end feeding system for a wire telecommunications system are given in the following with reference to FIGS. 1 and 2.

FIG. 1 is a conceptual circuit diagram of a double-end feeding power supply system. The system comprises a number of repeaters from 1 to n and constant-current supplies 11 and 12 positioned at both terminal stations. The repeaters are connected in series with a transmission line 50 (e.g., an underwater cable), between the respective output terminals 111 and 121 of the current supplies 11 and 12. The constant-current supplies 11 and 12 include respective constant-current generating sources 13 and 17, resistors 14 and 18, overvoltage protecting elements 15 and 19, and bypassing diodes 16 and 20. The resistors 14 and 18, which are referred to as slope resistors, provide the current-voltage characteristic curve of the sources 13 and 17 with a desired tilt in the constant-current region, as explained later. The overvoltage protecting elements 15 and 19, such as voltage limiters, protect the repeaters from a transient overvoltage caused when the power supply system is open-circuited, for example, and the bypassing diodes 16 and 20 keep the wire telecommunications system operable even when one of the current supplies 11 or 12 becomes inoperable.

In an underwater cable transmission system using fiber optics, hundreds of repeaters are connected in series with a span of approximately 30 km between adjacent repeaters, and a voltage E of, for example, 7000 volts, is fed from each of the constant-current supplies 11 and 12. As shown in FIG. 1, the constant-current supplies 11 and 12 are connected in series in the circuitry of the power supply system. That is, the polarities of the output voltages E of the constant-current supplies 11 and 12 are opposite to each other with respect to ground. Accordingly, the potential at the midpoint of the power supply line 50 is at ground level.

The output voltage E in the double-end feeding system is approximately one-half the voltage necessary when the repeaters are assumed to be fed by a single-end feeding system. This implies that the withstand voltages required for the circuit components and the assemblages thereof for the power supply system including the constant-current supplies, repeaters and the power feeding line, can be reduced to one-half those required in a single-end power feeding system. Thus, the task of designing a power supply system, as well as a reduction in cost, can be facilitated by employing the double-end feeding configuration.

As the distance between the terminal stations increases, the number of repeaters increases, and the feeding voltage E becomes higher, so that the double-end feeding configuration becomes an indispensable technology to a long-haul wire telecommunication system. However, it is important in the double-end feeding configuration that each of the constant-current supplies therefor should not have a power which is as great as the power for a single-end feeding system. In other words, the constant-current supplies should be designed to be applicable only to the double-end feeding configuration. The problem with constant-current supplies which have a large power in a double-end feeding configuration is described below.

FIG. 2 is the current-voltage characteristic diagram of a constant-current supply which is capable of providing the system shown in FIG. 1 with the necessary power, even for a single-end feeding mode. Referring to FIG. 2, the current and voltage supplied by the constant-current supply are regulated along the solid line in accordance with the change in the load resistance connected thereto. The dotted line connecting the origin 0 and the point "a" on the current-voltage curve corresponds to a load characteristic curve when the constant-current supply is operated in a double-end feeding mode, and the dotted line connecting the origin 0 and the point "b" on the current-voltage curve corresponds to a load characteristic curve when the constant-current supply is operated in a single-end feeding mode. Therefore, the points "a" and "b" are the respective stable points for the operations in the two modes. That is, the output voltage of the constant-current supply becomes steady at the voltage Ea in the double-end feeding mode and at Eb in the single-end feeding mode. The current-voltage curve exhibits a slope having a negative tilt in the voltage range between 0 and Ec. The negative tilt is provided by the above-mentioned resistor 14 or 18 so as to reduce the voltage fluctuation during the current regulating operation.

The constant-current supply reveals a so-called drooping characteristic for a voltage higher than Ec. That is, as the voltage increases, the current begins to decrease at the point "c" corresponding to the voltage Ec, and becomes zero at the voltage Ee. Accordingly, in a normal operation, the repeaters are protected from the application of a voltage larger than Ee. However, there may be a fast transient overvoltage higher than Ee, which is caused when the power feeding system line is abruptly cut off, for example. The above-mentioned overvoltage protecting elements 15 and 19 in FIG. 1, having a threshold voltage Ef, are provided to protect the repeaters from a transient overvoltage higher than Ef.

A constant-current supply is generally equipped with a circuit for shutting down the supply of current to the repeaters when the current supply loses its regulation function or when the load resistance on the power feeding line becomes larger than a predetermined value. The shutdown circuit is activated when the output current or voltage of the current supply become larger than a predetermined current Ig or a predetermined voltage Ed, both indicated in FIG. 2. The predetermined voltage Ed is usually selected to be in the voltage range in which the current supply exhibits the above-mentioned drooping characteristic. The current Ig, the voltage Ed and the corresponding point "d" on the drooping characteristic curve are referred to as the shutdown current, shutdown voltage and shutdown point, respectively. It is obvious from FIG. 2 that the above voltages are generally in the relationships, 2Ea=Eb and Eb<Ec<Ed<Ee<Ef.

It should be noted that there is an inevitable timing difference between the starts of the operations of the constant-current supplies in a double-end feeding power supply system. Accordingly, at the beginning of operation, the double-end feeding power supply system is in a pseudo singleend feeding mode, and the output current and voltage of the current supply which starts its operation first, change along the dotted line connecting the origin 0 and the point "b" in FIG. 2. In this constant-current supply, the drooping characteristic does not appear even when the output voltage reaches Eb corresponding to the point "b". Thus, if the double-end feeding power supply system as shown in FIG. 1 is fed by constant-current supplies having characteristics as shown in FIG. 2, the voltage +E or −E may occasionally rise up to Eb because of the starting timing difference in the constant-current supplies.

When both constant-current supplies have begun their operations, the voltages become stable at Ea. The above overvoltage during the pseudo single-end feeding mode requires the repeaters and the power feeding line to withstand a voltage of Eb, at least, which is approximately double the operating voltage Ea in the double-end feeding system. Therefore, such excess power is not only useless but is also undesirable in view of the above-mentioned withstand voltage. Accordingly, the constant-current supplies for a double-end power supply system should be those which have merely enough power for the operation in the double-end feeding mode.

The current-voltage characteristic of a constant-current supply which is designed to be exclusively used in a double-end feeding system is explained together with a conventional shutdown control therefor with reference to FIG. 3, wherein like references designate like or corresponding parts in FIG. 2. Referring to FIG. 3, the dotted line connecting the origin 0 and the point "a" corresponds to the load characteristic curve of the constant-current supply operating in a double-end feeding mode, and the dotted line connecting the origin 0 and the point "b1" corresponds to the load characteristic curve in the above-mentioned pseudo single-end feeding mode at the beginning of the operation of the double-end feeding system.

The constant current supply is provided with a drooping characteristic as represented by the solid line connecting the point "c" and the point Ee1 on the voltage axis as shown in FIG. 3. The drooping point "c" is set adjacent to the stable point "a" in the double-end feeding operation, and corresponds to a drooping voltage Ec which is shifted lower than the voltage Eb and is different from the voltage Ec in FIG. 2. During the period of the pseudo single-end feeding mode, the current and voltage increase along the dotted line connecting the origin 0 and the point "b1" on the drooping characteristic curve. The current and voltage reach a stable point "a" through the points "b1" and "c" when the other constant-current supply begins its operation. Thus, the voltage E in the double-end feeding system can be reduced by using constant-current supplies having the characteristics shown in FIG. 3. As a result, the threshold voltage Ef of the above-mentioned overvoltage protecting elements 15 and 19 in FIG. 1 can be lower, and the withstand voltages for the circuit components and the assemblages thereof of the current supplies and repeaters, can also be decreased.

The constant-current supply having current-voltage characteristics as shown in FIG. 3 is provided with a circuit for shutdown thereof when the current or voltage exceeds the respective predetermined values Ig and Ed. The predetermined voltage Ed is selected to correspond to a point "d" on the drooping charcteristic curve. Obviously, the voltage Ed must be between a voltage Eb1 (not shown) corresponding to the point "b1" and the voltage Ee1. Therefore, a higher accuracy is required for the detection of Ed compared with that in the current-voltage characteristic of FIG. 2.

FIG. 4 is a block diagram of a conventional shutdown control circuit which acts as a shutdown controlling means for a constant-current supply 21. The shutdown controlling means comprises a current detecting circuit 22, a voltage detecting circuit 23 and an OR gate 24. The current detecting circuit 22 detects the current fed by the constant-current supply 21 to a load resistance R, and outputs a signal when the current exceeds the value Ig, the shutdown current. The voltage detecting circuit 23 detects the voltage fed by the constant-current supply 21 and outputs a signal when the voltage exceeds the shutdown voltage Ed. The OR gate 24 outputs a control signal to cause the constant-current supply 21 to be shut down upon receiving an output signal from either the current detecting circuit 22 or the voltage detecting circuit 23.

Referring again to FIG. 3, the withstand voltage requirements can be eased further by providing the constant-current supplies with a steeper or inverted drooping characteristic as shown by the dotted lines including one connecting the drooping point "c" and the point Ee2 on the voltage axis and the other connecting the point "c" and Ee3 on the voltage axis. However, the respective shutdown points (not shown) on these drooping characteristic curves are at a voltage which is less than or equal to the voltage at the points "b2" and "b3" which are the respective intersections of the steeper and inverted drooping characteristic curves, and the load characteristic curve for the above-mentioned pseudo single-end feeding mode. Accordingly, the current supply is shut down as soon as the output voltage thereof reaches the voltage corresponding to the point "b2" or as soon as the output voltage reaches the voltage corresponding to the point "b3". This means that the withstand voltage reduction by the steeper or inverted drooping characteristic cannot be achieved by using the conventional shutdown circuit shown in FIG. 4. Therefore, there is a need for a novel controlling means for shutting down an electric power supply having the above-mentioned steep or inverted drooping characteristic.

The above description also applies to a constant-voltage supply if the relationship between the current and voltage in the current-voltage characteristic diagram of the constant-current supply are substituted for each other; however, the details will be discussed in the description of the preferred embodiments.

SUMMARY OF THE INVENTION

It is an object of the present invention to provide a control circuit for shutting down a constant-current or voltage supply having a steep or inverted drooping characteristic.

It is another object of the present invention to provide a control circuit capable of shutting down a constant-current or voltage supply regardless of the drooping characteristic of the current or voltage supply.

It is still another object of the present invention to provide a shutdown control circuit for constant-current supplies in a double-end feeding power supply system for a long-haul wire telecommunications system, wherein the shutdown control circuit allows a reduction in the withstand voltage required for the circuit components and the assemblages thereof for the constant current supplies and repeaters.

The above objects are achieved by a shutdown control circuit comprising means for detecting the voltage at the output terminal of the constant-current supply, means for detecting the current flowing therethrough, and means for generating a control signal for shutting down the constant current supply when a condition exists where the detected voltage is larger than a predetermined voltage value and the detected current is smaller than a predetermined current value. In an embodiment for use with a constant voltage supply, a control signal is generated when the detected voltage is smaller than a predetermined voltage value and the detected current is larger than a predetermined current value. The voltage detecting means comprises a voltage detecting circuit, the current detecting means comprises a current detecting circuit, and the control signal generating means comprises an AND gate. The AND gate provides the control signal for shutting down the constant current or voltage upon receiving output signals from both of the voltage and current detecting circuits. The AND gate can be replaced by an arithmetic means which processes the output signals from the voltage detecting circuit and the current detecting circuit so as to provide a ratio of the voltage to the current, and which outputs a shutdown control signal when the resistance corresponding to the ratio is larger or smaller than a predetermined load resistance at which feeding of the power from the constant-current or voltage supply is stopped.

BRIEF DESCRIPTION OF THE DRAWINGS

The foregoing and other objects and features of the present invention will be apparent from a reading of the following description and claims taken in connection with the accompanying drawings in which like reference numerals designate like parts throughout and in which:

DETAILED DESCRIPTION OF THE PREFERRED EMBODIMENTS

Figure 5:
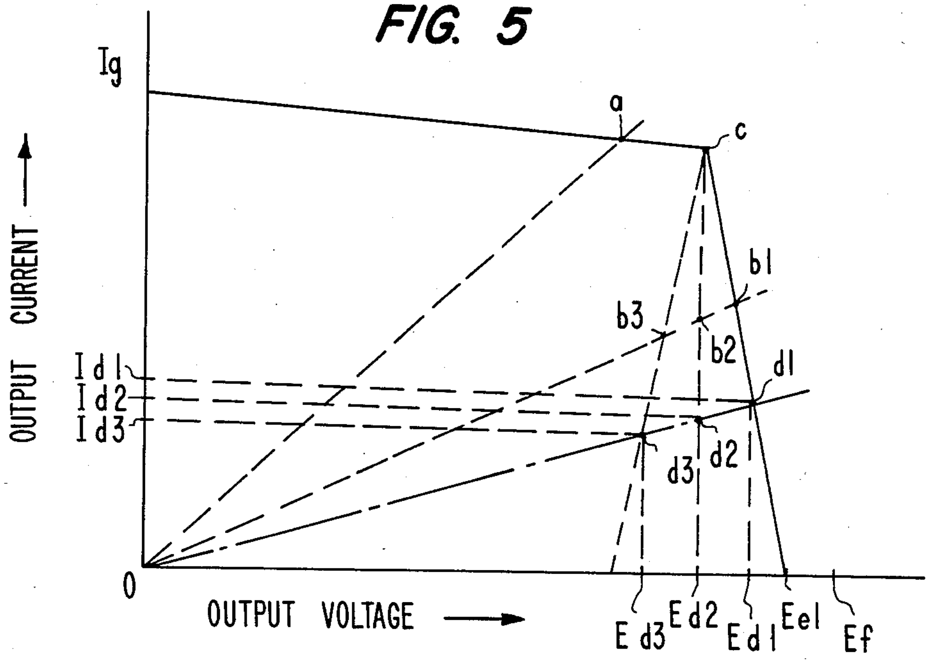
FIG. 5 is a current-voltage characteristic diagram for a constant-current supply, illustrating the operating principle of the shutdown control circuit for a constant-current supply in accordance with the present invention.
Figure 6:
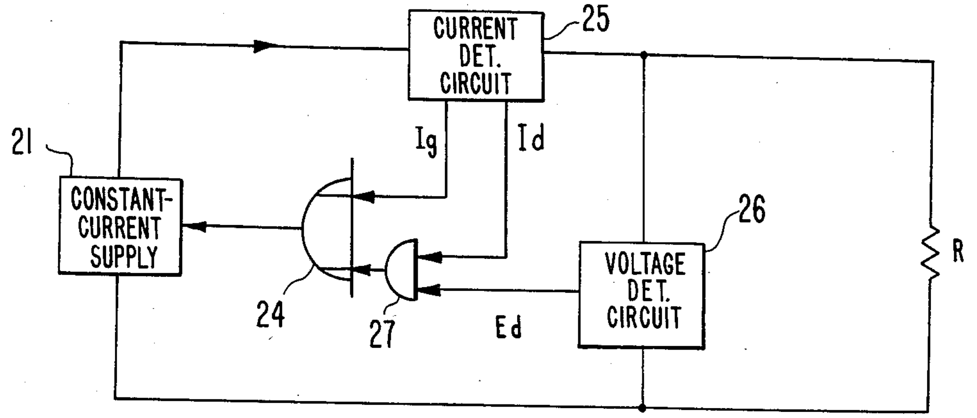
FIG. 6 is a block diagram of a shutdown control circuit for a constant-current supply in accordance with a first embodiment of the present invention.

FIG. 5 is a current-voltage characteristic diagram for a constant-current supply to which the shutdown control circuit of the present invention is applied, and FIG. 6 is a block diagram of a shutdown control circuit in accordance with a first embodiment of the present invention. The operating principle of the shutdown control will be explained with reference to FIGS. 5 and 6.

Figure 1:
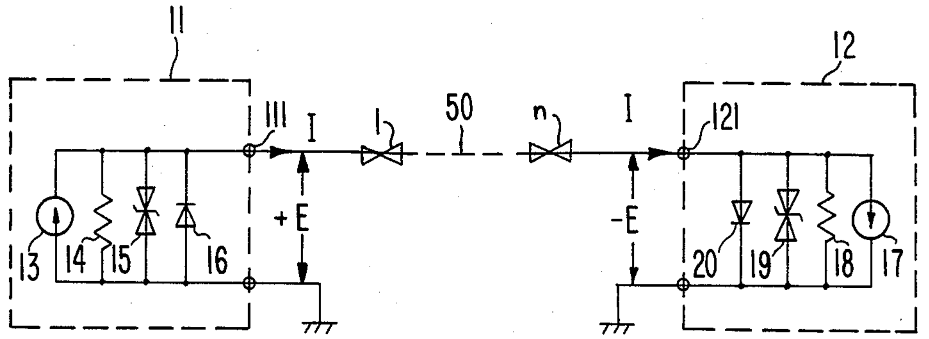
FIG. 1 PRIOR ART
FIG. 1 is a circuit diagram of a double-end feeding power supply system.
Figure 2:
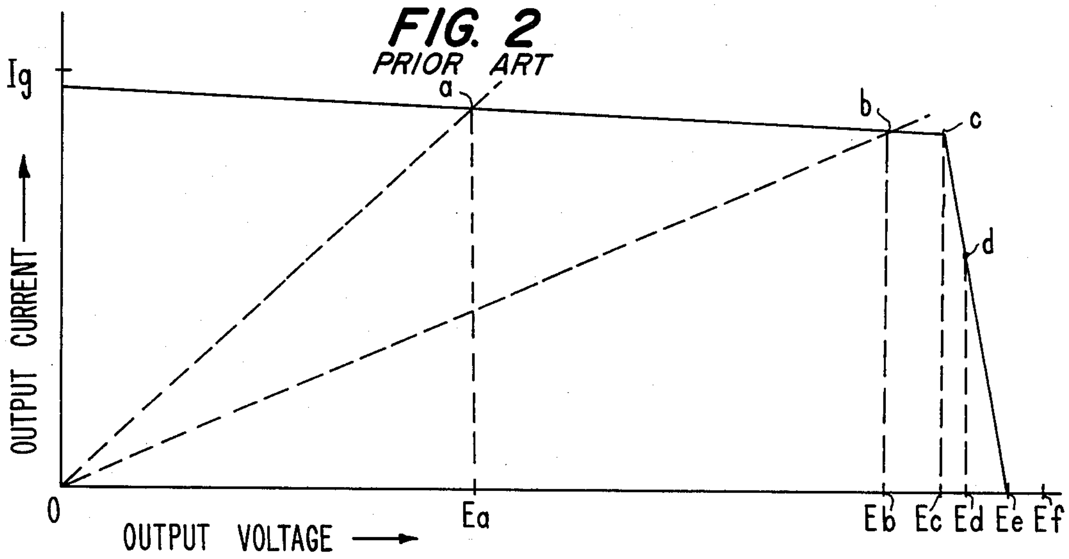
FIG. 2 PRIOR ART
FIG. 2 is a current-voltage characteristic diagram for a conventional current supply applicable to both a single-end feeding power supply system and a double-end feeding power supply system.
Figure 3:
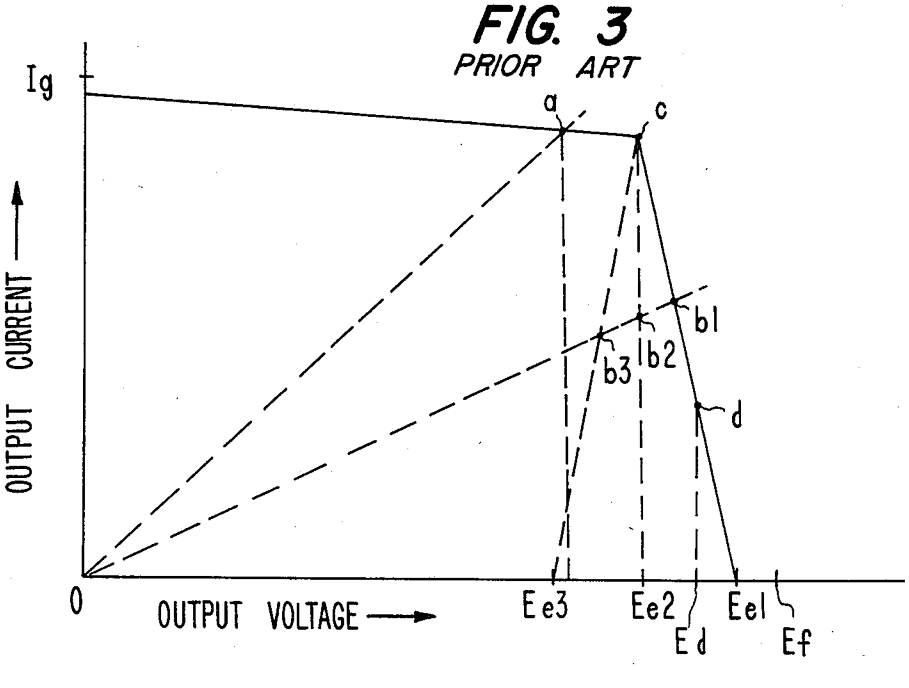
FIG. 3 PRIOR ART
FIG. 3 is a current-voltage characteristic diagram for a conventional constant-current supply which is applicable only to a double-end feeding power supply system.

The constant-current supply is designed to be exclusively applicable to a double-end feeding power supply system and the current-voltage characteristic is quite similar to that shown in FIG. 3. That is, the current-voltage characteristic has a drooping characteristic represented by a line connecting the drooping point "c" and the point Ee1 on the voltage axis, wherein the drooping voltage Ec (not shown) and the voltages Ee1 and Ef are equal to the corresponding voltages in FIG. 3. Further, a point "d1" which corresponds to the shutdown point "d" in FIG. 3 is defined on the drooping characteristic curve.

Figure 4:
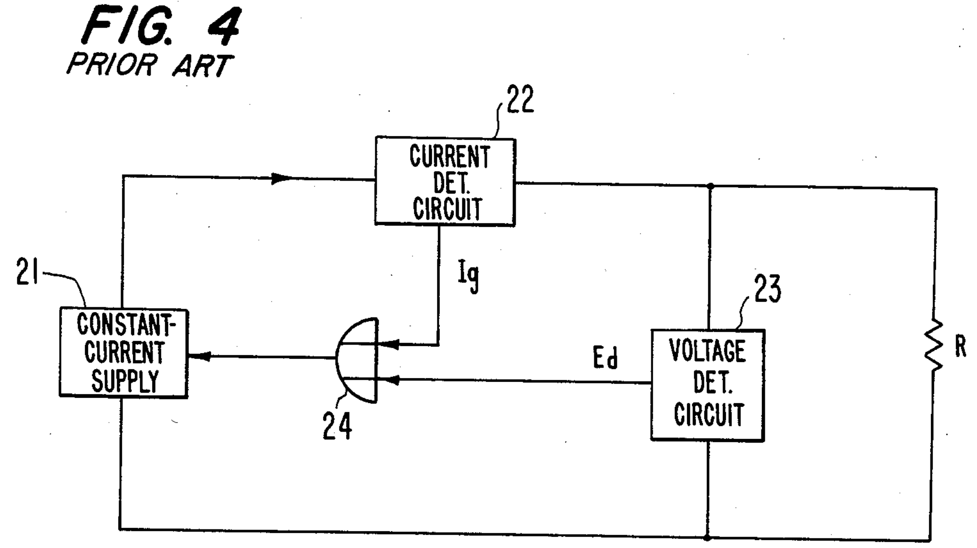
FIG. 4 PRIOR ART
FIG. 4 is a block diagram of a conventional shutdown control circuit for a constant-current supply.

Operation of the shutdown control circuit of this embodiment is carried out based on the load characteristic line connecting the origin 0 and the point "d1". The load characteristic line corresponds to a load circuit input resistance at which feeding of a current from the constant-current supply is stopped. The input resistance is referred to as a maximum allowable load resistance, hereinafter. The shutdown control circuit shown in FIG. 4 provides a signal for shutting down the constant-current supply 21 as soon as it detects an output voltage larger than the shutdown voltage Ed. On the other hand, the shutdown control circuit of this embodiment (FIG. 5) does not provide a shutdown control signal for the current supply (even upon detecting an output voltage larger than the voltage Ed1), unless the corresponding output current is smaller than Id1 which is the current corresponding to the point "d1". That is, the shutdown signal is generated when the detected voltage and the detected current correspond to a point below the load characteristic curve.

Referring to FIG. 6, the shutdown control circuit of this embodiment comprises an AND gate 27 having inputs connected to a current detecting circuit 25 and a voltage detecting circuit 26, respectively, and having an output connected to an OR gate 24. The current detecting circuit 25 provides a signal for the OR gate 24 when the output current from the constant-current supply 21 is larger than a predetermined shutdown current Ig, so that the constant-current supply 21 is shut down. The current detecting circuit 25 also provides an output signal for the AND gate 27 when the output current is smaller than Id1. At the same time, the voltage detecting circuit 26 detects the output voltage from the constant-current supply 21 and provides a signal for the AND gate 27 when the output voltage is larger than Ed1. Accordingly, the AND gate 27 outputs a signal for the OR gate 24 for shutting down the constant-current supply 21 only when the output current is smaller than Id1 and the output voltage has reached Ed1.

Referring back to FIG. 5, in the normal operation of the constant-current supply, the current and voltage fed therefrom increase along the load characteristic line connecting the origin 0 and the point "b1" on the drooping characteristic curve due to the above-mentioned timing difference between the current supplies operated in the double-feeding mode. The current and voltage reach the stable point "a" for the double-end feeding power supply system after passing through the point "b1" and the drooping point "c". Thus, the current on the load characteristic line connecting 0 and the point "b1" becomes larger than Id1 before the corresponding voltage reaches Ed1. Therefore, the current supply 21 can be prevented from an erroneous shutdown even when there is only a small difference between the voltage Ed1 and the voltage Eb1 (not shown) corresponding to the point "b1".

The shutdown control circuit of the present invention permits a current-voltage characteristic to have a steep drooping characteristic as shown by the line connecting the point "c" and Ed2 on the voltage axis, or to have the above-mentioned inverted drooping characteristic as shown by the line connecting the point "c" and Ed3 on the voltage axis. For the former and the latter drooping characteristics, the current detecting circuit 25 in FIG. 6 is designed so as to continue to provide a signal for the AND gate 27 while the output current from the constant-current supply 21 is smaller than Id2 and Id3, respectively. The voltage detecting circuit 26 detects the output voltage from the current supply 21 and provides a signal for the AND gate 27 when the output voltage is larger than Ed2 and Ed3, respectively.

Although the voltage Eb2 (not shown) corresponding to the point "b2" on the former drooping characteristic curve is almost equal to Ed2 for the former drooping characteristic, the output current increasing along the line connecting the origin 0 and the point "b2" becomes larger than Id2 before the output voltage reaches the voltage Ed2. Therefore, no shutdown signal for the current supply 21 is output by the AND gate 27. Similarly, the voltage Ed3 is actually lower than the voltage Eb3 (not shown) corresponding to the point "b3" in the latter drooping characteristic curve. However, the output current increasing along the line connecting the origin 0 and the point "b3" becomes larger than Id3 before the output voltage reaches the voltage Ed3. Therefore, no shutdown control signal for the current supply 21 is provided by the AND gate 27. If the input resistance R of a load circuit is sufficiently large that it corresponds to the load characteristic line passing through the points d2 and d3, the output current becomes Id2 and Id3 at the respective corresponding output voltages Ed2 and Ed3, and the AND gate 27 provides a shutdown control signal for the current supply 21. Thus, according to the shutdown control circuit of this embodiment, the constant-current supply 21 can be designed to have a drooping characteristic steeper than that allowed for conventional constant-current supplies, and can even have the above-described inverted drooping characteristic which cannot be employed conventionally.

Figure 7:
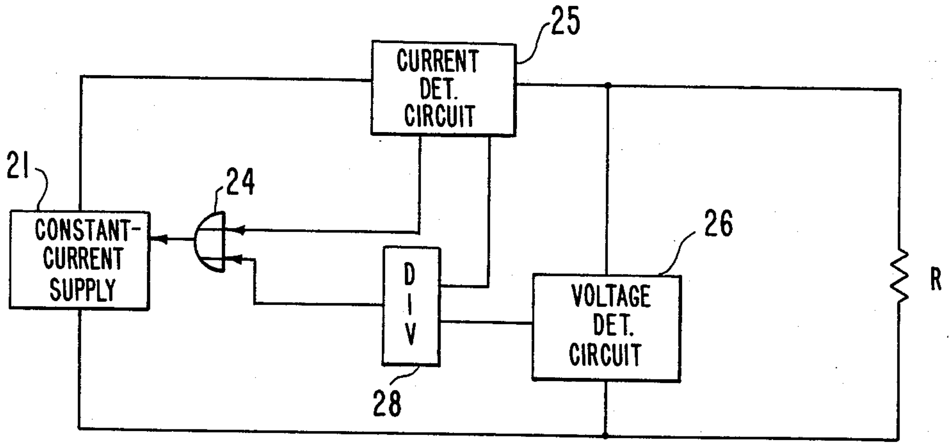
FIG. 7 is a block diagram of a shutdown control circuit for a constant-current supply in accordance with a second embodiment of the present invention.

The above-described shutdown control condition is achieved when the input resistance of the load circuit connected to a constant-current supply is detected to be larger than the above-mentioned maximum allowable load resistance defined by the line connecting the origin 0 and the points d1, d2 or d3 on the respective drooping characteristic curves. This means that the shutdown control circuit is operable even when the output voltage does not reach the voltage Ed1, Ed2 or Ed3. Since the input resistance can easily be obtained as the ratio of the output voltage to the output current, an arithmetic operation means is provided for this purpose in the second embodiment of the shutdown control circuit of the present invention. FIG. 7 is a block diagram of a shutdown control circuit in accordance with a second embodiment of the present invention. In the circuit of FIG. 7, a divider circuit (DIV) 28 is provided in place of the AND gate 27 in FIG. 6, to which respective detecting signals are sent from the current detecting circuit 25 and the voltage detecting circuit 26, corresponding to the detected current and the detected voltage of the constant-current supply 21. The divider circuit 28 outputs a shutdown control signal when the result of the division (i.e., the ratio of the detected voltage to the detected current) is larger than the maximum allowable load resistance, and the constant-current supply 21 is shut down.

Figure 8:
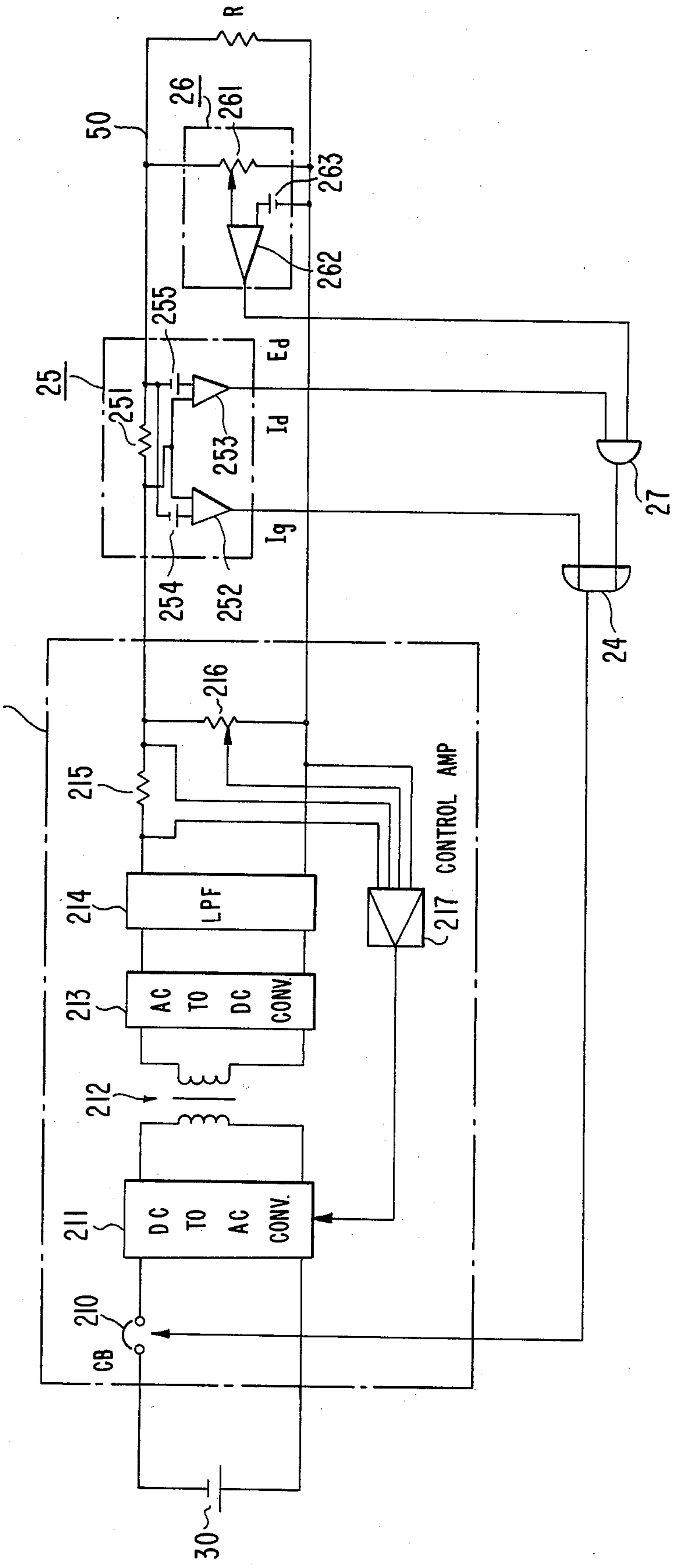
FIG. 8 is a block diagram of an example of the detailed configuration of a shutdown control circuit for a constant-current supply in accordance with the embodiment of FIG. 6.

FIG. 8 is a block diagram of an example of the detailed configuration of the shutdown control circuit for a constant current supply in accordance with the embodiment of FIG. 6. Referring to FIG. 8, the constant-current supply 21 includes a circuit breaker 210 which is coupled to a direct current (DC) source 30. DC voltage supplied from the DC source 30 is input to a DC-to-AC converting circuit 211 where it is converted to an alternating current (AC). The alternating current is then input to an AC-to-DC converting circuit 213 (which is referred to as a rectifier), after being stepped up by a stepup transformer 212. The rectifier 213 outputs DC power, from which AC components included therein are removed by a low-pass filter circuit 214. Resistor 215, potentiometer 216 and control amplifier 217 provide the constant-current supply 21 with constant-current and drooping characteristics. That is, if the output current of the rectifier 213 increases, the voltage drop across the resistor 215 increases, and the control amplifier 217 instructs the DC-to-AC converter 211 to decrease its output current. On the other hand, if it is detected by the potentiometer 216 that the output voltage has reached the drooping point "c" in FIG. 5 (note that the drooping point can be varied via the potentiometer 216), the control amplifier 217 instructs the DC-to-AC converter 211 to decrease the current output therefrom. The output current from the DC-to-AC converter 211 is controlled by changing the chopping frequency of the DC-to-AC converter 211.

The current detecting circuit 25 comprises a resistor 251 connected in series with the current supply line 50 and connected to operational amplifiers 252 and 253. The operational amplifier 252 detects the voltage drop across the resistor 51 and compares it with a reference voltage 254. The reference voltage 254 is set equal to the voltage drop caused by the above-mentioned overcurrent Ig flowing through the line 50. Thus, an overcurrent detection signal can be provided for the OR gate 24. The operational amplifier 253 also detects the voltage drop across the resistor 251 and compares it with another reference voltage 255. The reference voltage 255 is set equal to the voltage drop caused by the current Idi corresponding to the shutdown point di, where i denotes 1, 2 or 3, in FIG. 5. A detection signal for the shutdown control operation is provided for the AND gate 27.

The voltage detecting circuit 26 comprises a potentiometer 261 and an operational amplifier 262. The operational amplifier 262 receives an input voltage corresponding to the output voltage of the current supply 21, from the potentiometer 261 and compares the input voltage with a reference voltage 263. The reference voltage 263 is set equal to the input voltage corresponding to Edi, where i denotes 1, 2 or 3, in FIG. 5. A detection signal indicating that the output voltage is greater than or equal to the voltage Edi, is provided for the AND gate 27.

The AND gate 27 provides a control signal for the OR gate 24 when receiving the detection signals from both of the operational amplifiers 253 and 262. The OR gate 24 outputs a shutdown control signal for the circuit breaker 210 in the constant-current supply 21 when receiving a control signal from either the operational amplifier 252 or the AND gate 27. As a result, the constant-current supply 21 is separated from the DC supply 30 so that no current is supplied to the load resistance R.

Figure 9:
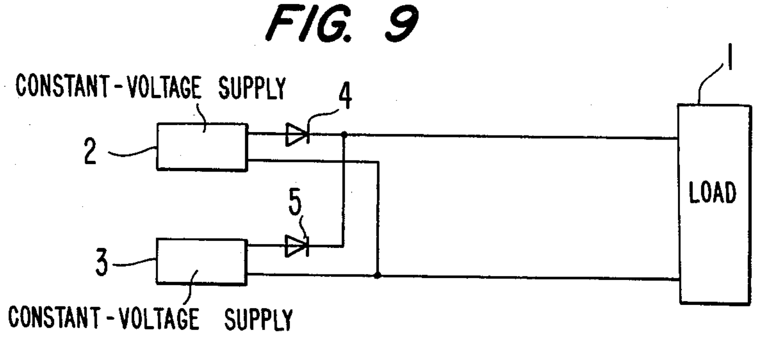
FIG. 9 is a block diagram of a circuit in which the power is supplied from a pair of constant-voltage supplies connected in parallel to each other and to a load circuit.

The shutdown control circuit of the present invention can also be applied to a constant-voltage supply which is connected in parallel to another equivalent constant voltage supply. As electronic equipment is provided with more versatile and more complicated functions, the current supplied thereto increases. Accordingly, plural constant-voltage supplies are sometimes provided for the equipment, and are connected in parallel to each other as shown in FIG. 9. Referring to FIG. 9, a load circuit 1 is supplied with electric power from a pair of constant voltage supplies 2 and 3. In the configuration shown in FIG. 9, there is an inevitable starting timing difference between the constant-voltage supplies as described in the above double-end feeding system including constant-current supplies.

Figure 10:
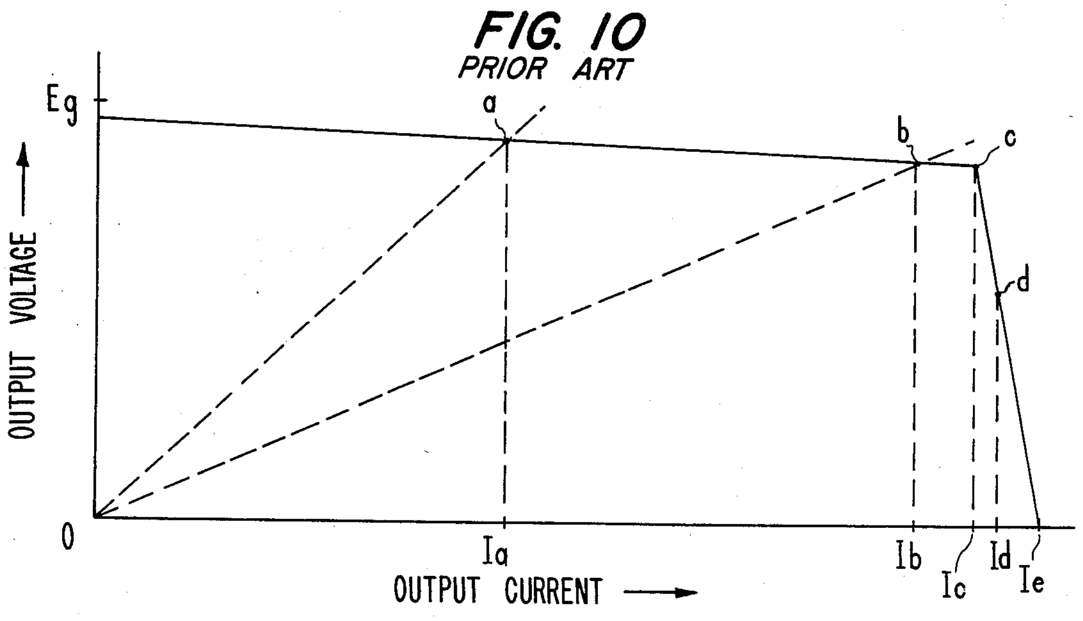
FIG. 10 PRIOR ART
FIG. 10 is a voltage-current characteristic diagram for one of a pair of conventional constant-voltage supplies connected in parallel to each other and to a load circuit, each constant-voltage supply having power sufficient for operating the load circuit by itself.

FIG. 10 is a voltage-current characteristic curve for a constant-voltage supply which is assumed to have power sufficient for operating a load circuit in a configuration as shown in FIG. 9. Referring to FIGS. 9 and 10, if the constant-voltage supply 2, for example, starts operation first, the voltage and current fed by the constant-voltage supply 2 increase along the dotted line connecting the origin 0 and a point "b" on the voltage-current characteristic curve, and becomes stable at Ib corresponding to the point "b". When the other constant voltage supply 3 begins operation, the voltage and current move to a point "a" along the voltage-current curve and the current becomes stable at Ia corresponding to the point "a". Ia is the current fed from each of the constant-voltage supplies 2 and 3 during concurrent operation. Diodes 4 and 5 in FIG. 9 are provided for preventing the current output from the earlier starting one of the constant voltage supplies 2 and 3 from flowing into the later starting one.

Each of the constant-voltage supplies 2 and 3 is provided with a drooping characteristic represented by a line connecting a point "c" on the voltage-current characteristic curve and Ie on the current axis. That is, as the current increases to be greater than the current Ic corresponding to the point "c", the output voltage decreases toward Ie on the current axis. The point "c" is referred to as the drooping point. Further, each of the constant-voltage supplies 2 and 3 is shut down when the output voltage thereof becomes larger than the voltage Eg or the output current is larger than the current Id corresponding to a shutdown point "d" defined on the drooping characteristic curve. In FIG. 10, the above-mentioned characteristic currents are in relationships of 21*a* =Ib and Ib<Ic<Id<Ie.

In order to reduce current capacities required for the circuit elements and the assemblage thereof for the constantvoltage supplies 2 and 3, and to decrease an overcurrent when the input of the load circuit 1 is short-circuited, it is desired that the constant-voltage supplies 2 and 3 have the point "c" shifted to a lower current side and have a steeper drooping characteristic, wherein the characteristic currents are in relationships of Ib<2Ia and Ia<Ic<Ib<Ib<Id<Ie. That is, it is desired that the point "b" be located on the drooping characteristic curve. Accordingly, problems have arisen concerning the detection of Id and shutdown control based on Id, similar to the problems relating to Ed in the double-end feeding power supply system including constant-current supplies described above with reference to FIGS. 3 and 4.

Figure 11:
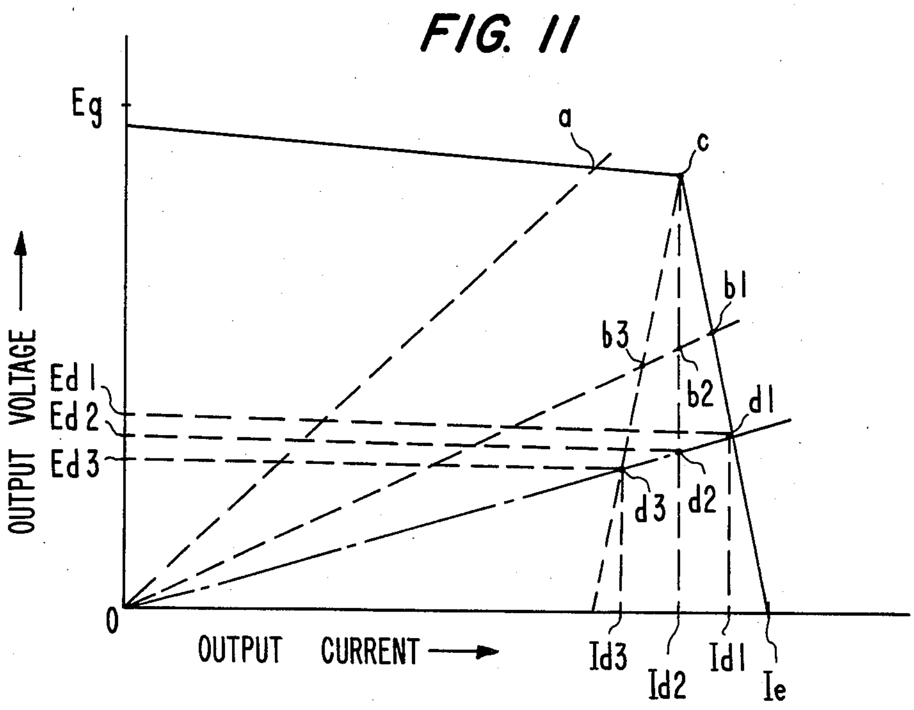
FIG. 11 is a voltage-current characteristic diagram for a constant voltage supply, illustrating the operating principle of a shutdown control circuit applied to a constant-voltage supply in accordance with the present invention.

However, the shutdown control circuit of the present invention which operates based on the output current and voltage corresponding to a shutdown point, can be applied to a constant-voltage supply having any drooping characteristic. FIG. 11 is a voltage-current characteristic diagram of a constant-voltage supply, illustrating the operating principle of the shutdown control circuit for a constant-voltage supply in accordance with the present invention. Referring to FIG. 11, the dotted lines connecting the origin 0 and the point "a" and the origin 0 and the point "b1" are load characteristic curves corresponding to conditions where both constant-voltage supplies 2 and 3 in FIG. 9 are in operation, and where only one of the constant-voltage supplies 2 and 3 is in operation, respectively. The dotted line connecting the origin 0 and the point "d1" corresponds to a load resistance (i.e., an input resistance of the load circuit 1 in FIG. 9) at which the feeding of the voltage is to be stopped. Since the slope of the dotted lines in FIG. 11 represent respective resistance values, the dotted line passing through the origin 0 to the point "d1" corresponds to a minimum allowable load resistance.

Figure 12:
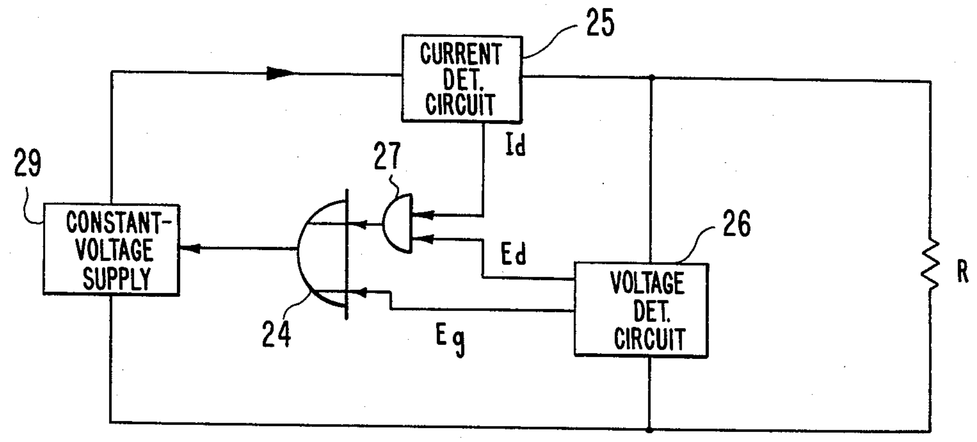
FIG. 12 is a block diagram of a shutdown control circuit for a constant-voltage supply in accordance with a third embodiment of the present invention.

FIG. 12 is a block diagram of a shutdown control circuit in accordance with a third embodiment of the present invention. Referring to FIG. 12, the shutdown control circuit comprises OR gate 24, current detecting circuit 25, voltage detecting circuit 26 and AND gate 27. The voltage detecting circuit 26 provides the OR gate 24 with a shutdown control signal for the constant-voltage supply 29 when the output voltage of the constant-voltage supply 29 is larger than Eg, and also provides the AND gate 27 with a detection signal when the output voltage is lower than the voltage Ed1. The current detecting circuit 25 provides the AND gate 27 with a detection signal when the current from the constant-voltage supply 29 is larger than the current Id1. Accordingly, the AND gate 27 outputs a shutdown control signal for the constant-voltage supply 29 only when the conditions of the output voltage lower than Ed1 and the output current larger than Id1 are both achieved.

As described above, the shutdown control circuit of the third embodiment of the present invention, which is based on the detection of the output voltage and current, can operate independently of the drooping characteristic of the constant voltage supply. For instance, the drooping characteristic can be steep as represented by a line connecting the points "c" and "b2" or can be inverted as represented by a line connecting the points "c" and "b3", as shown in FIG. 11. For these drooping characteristics, the shutdown points are "d2" and "d3", respectively. In accordance with these drooping characteristic curves, the current detecting circuit 25 detects Id2 or Id3, while the voltage detecting circuit 26 detects Ed2 or Ed3.

Figure 13:
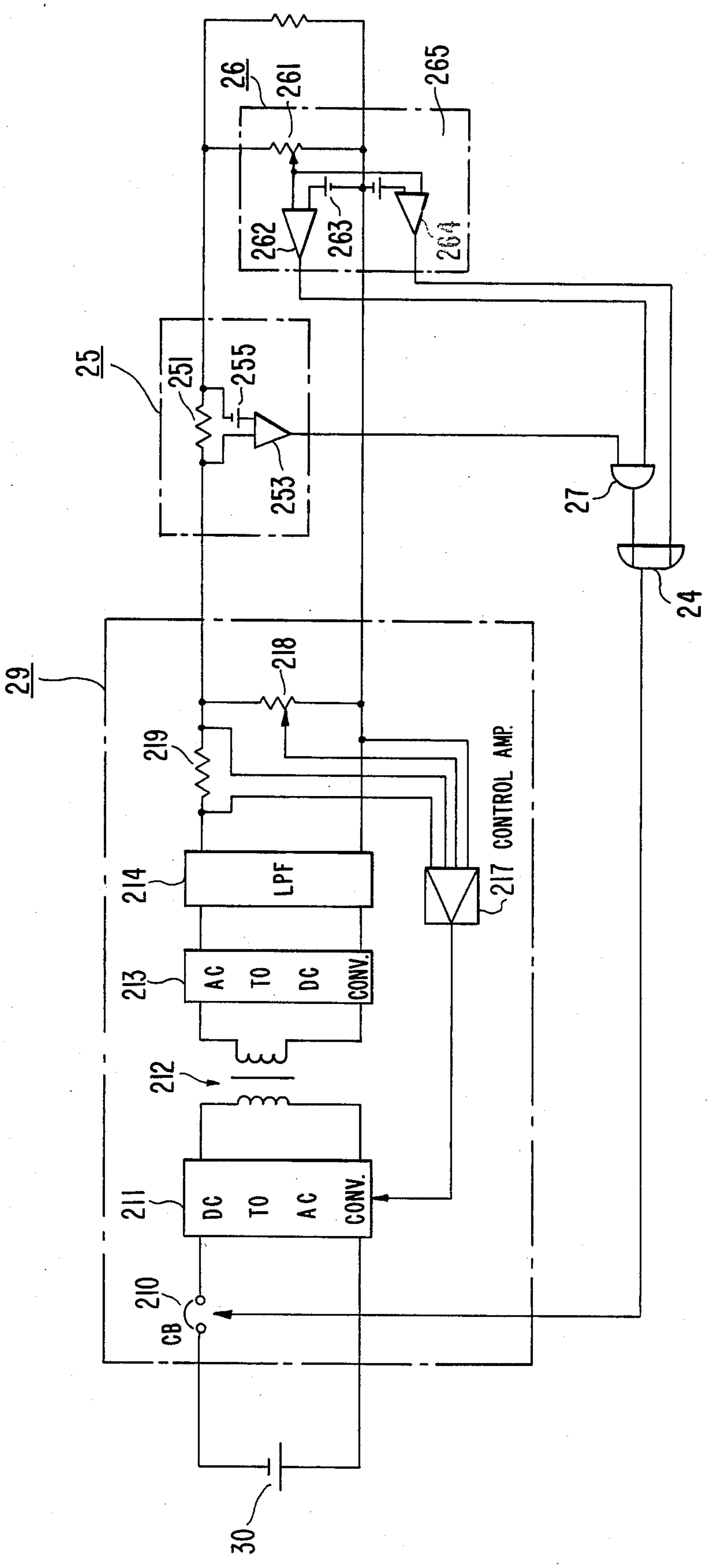
FIG. 13 is a block diagram of an example of a detailed configuration of the shutdown control circuit for a constantvoltage supply in accordance with the embodiment of FIG. 12.

FIG. 13 is a block diagram of an example of a detailed configuration of the shutdown control circuit for a constant-voltage supply in accordance with the present invention. Referring to FIG. 13, the constant-voltage supply 29 includes a circuit breaker 210 which is operatively connected to a direct current (DC) source 30. DC voltage supplied from the DC source 30 is input to a DC-to-AC converter 211 to be converted to an alternating current (AC). The alternating current is then input to a rectifier 213, after being stepped up by a stepup transformer 212. The rectifier 213 outputs no power, from which AC components included therein are removed by a low-pass filter circuit 214. Potentiometer 218, resistor 219 and control amplifier 217 provide the constant-voltage supply 29 with constant-voltage and drooping characteristics. That is, if the output voltage of the rectifier 213 increases, the voltage drop across the potentiometer 218 increases, and the control amplifier 217 instructs the DC-to-AC converter 211 to decrease the output voltage. On the other hand, if it is detected by the resistor 219 that the output current has reached a current corresponding to the drooping point "c" in FIG. 11, the control amplifier 217 instructs the DC-to-AC converter 211 to decrease the voltage output therefrom. The output voltage of the DC-to-AC converter 211 is controlled by changing the chopping frequency of the DC-to-AC converter 211.

The current detecting circuit 25 comprises a resistor 251 connected in series with the current supply line 50 and an operational amplifier 253. The operational amplifier 253 detects the voltage drop across the resistor 251 and compares it with reference voltage 255. The reference voltage 255 is set equal to the voltage drop caused by the current Idi corresponding to the shutdown point di, where i denotes 1, 2 or 3, in FIG. 11. Thus, a detection signal for the shutdown control operation is provided for the AND gate 27.

The voltage detecting circuit 26 comprises a potentiometer 261 and operational amplifiers 262 and 264. The operational amplifier 264 detects the voltage drop across the potentiometer 261 and compares it with a reference voltage 265. The reference voltage 265 is set equal to the voltage drop corresponding to the above-mentioned overvoltage Eg on the line 50. Thus, a control signal for the shutdown operation based on the overvoltage Eg is provided for the OR gate 24. The operational amplifier 262 receives an input voltage corresponding to the output voltage of the constant-voltage supply 29 from the potentiometer 261 and compares the input voltage with a reference voltage 263. The reference voltage 263 is set equal to the input voltage corresponding to the voltage Edi, where i denotes 1, 2 or 3 in FIG. 11. Thus, a detection signal indicating an output voltage which is less than or equal to the voltage Edi is provided for the AND gate 27.

The AND gate 27 provides a control signal for the OR gate 24 when receiving the detection signals from both of the operational amplifiers 253 and 262. The OR gate 24 outputs a shutdown control signal for the circuit breaker 210 in the constant voltage supply 29 when receiving a control signal from either the operational amplifier 264 or the AND gate 27. Thus, the constant voltage supply 29 is separated from the DC supply 30 so that no voltage is supplied to the load resistance R.

Figure 14:
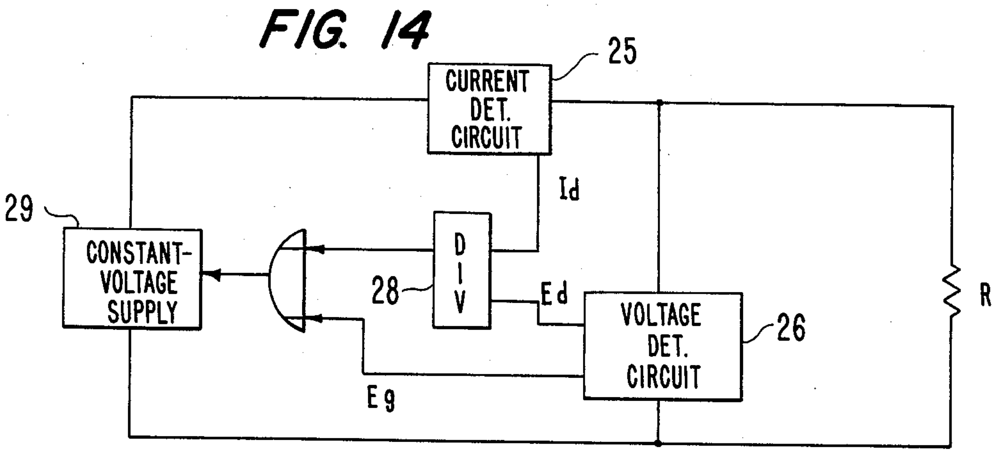
FIG. 14 is a block diagram of a shutdown control circuit for a constant-voltage supply in accordance with a fourth embodiment of the present invention.

FIG. 14 is a block diagram of a shutdown control circuit in accordance with a fourth embodiment of the present invention. In the circuit of FIG. 14, a divider circuit 28 is provided as a substitute for the AND gate 27 in FIG. 12, to which the respective detecting signals are always sent from the current detecting circuit 25 and the voltage detecting circuit 26, corresponding to the output current and output voltage of the constant voltage supply 29. The divider circuit 28 outputs a shutdown control signal when the result of the division (i.e., the ratio of the output voltage to the output current) is equal to or smaller than the minimum allowable load resistance, and, as a result, the constant voltage supply 29 is shut down.

The many features and advantages of the invention are apparent from the detailed specification, and thus it is intended by the appended claims to cover all such features and advantages of the circuit which fall within the true spirit and scope of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. A shutdown control circuit for a constant-current supply having an output terminal connected to a load circuit having an input resistance which varies, comprising:

voltage detecting means for detecting the voltage at the output terminal of the constant-current supply;

current detecting means for detecting the current flowing through the constant-current supply; and signal generating means for generating a signal for shutting down the constant-current supply when a condition exists where the detected current is greater than a first predetermined current value or when a condition exists where the detected voltage is greater than a predetermined voltage value and the detected current is less than a second predetermined current value, the first predetermined current value being greater than the second predetermined current value, the predetermined voltage value and the second predetermined current value being determined so that the ratio thereof corresponds to the input resistance of the load circuit at which the supply of current from the constant-current supply is shut down;

said voltage detecting means comprising a voltage detecting circuit for detecting the voltage at the output terminal of the constant-current supply, said voltage detecting circuit having an output and providing a high level output signal at the output when the detected voltage is greater than the predetermined voltage value;

said current detecting means comprising a current detecting circuit for detecting the current flowing through the output terminal of the constant-current supply, said current detecting circuit having first and second outputs, said current detecting circuit providing a high level output signal at the first output when the current is less than the second predetermined current value, said current detecting circuit providing a high level output signal at the second output when the current is greater than the first predetermined current value;

said signal generating means comprising an OR gate having first and second inputs and an AND gate having two inputs connected to the output of said voltage detecting circuit and the first output of said current detecting circuit, respectively, and having an output for providing a high level output signal upon receiving the respective high level output signals from said voltage detecting circuit and the first output of said current detecting circuit, the first and second inputs of said OR gate being connected to the output of said AND gate and the second output of said current detecting circuit, respectively, for providing the shutdown signal for the constant-current supply upon receiving the high level output signal from said AND gate or the high level output signal at the second output of said current detecting circuit.

2. A shutdown control circuit for a cosntant-current supply having an output terminal connected to a load circuit having an input resistance, comprising:

detecting means for detecting the value of the input resistance and the current flowing through the constant-current supply, said detecting means including:

a voltage detecting circuit for detecting the voltage at the output terminal of the constant-current supply, said voltage detecting circuit having an output and providing an output signal corresponding to the detected voltage at the output; and a current detecting circuit for detecting the current flowing through the output terminal of the constant-current supply, said current detecting circuit having a first output for providing a first output signal corresponding to the detected current at the output terminal of the constant-current supply, and having a second output for providing a second output signal upon detecting that the current at the output terminal of the constant-current supply is greater than a predetermined current value; and signal generating means for generating a signal for shutting down the constant-current supply when the input resistance is greater than a predetermined resistance value or when the detected current is greater than a predetermined current value, said signal generating means including:

arithmetic operation means for processing the output signal of said voltage detecting circuit and the first output signal of said current detecting circuit, so as to provide a ratio of the voltage to the current, said arithmetic operation means providing a high level output signal when the ratio of the voltage to the current is greater than the predetermined resistance value at which feeding of the from the constant-current supply is shut down; and an OR gate having first and second inputs connected to said arithmetic operation means and the second output of said current detecting circuit, respectively, said OR gate providing the shutdown signal upon receiving the high level output signal from said arithmetic operation means or the second output signal of said current detecting circuit.

3. A shutdown control circuit as set forth in claim 2, wherein said voltage and current detecting circuits include means for providing digital values corresponding to the detected voltage and the detected current, respectively, and wherein said arithmetic operation means includes means for processing the digital values so as to provide a digital value corresponding to the ratio of the voltage to the current.

4. A shutdown control circuit as set forth in claim 3, wherein said arithmetic operation means includes:

first means for providing digital values corresponding to the output signal of said voltage detecting circuit and the first output signal of said current detecting circuit; and second means for processing the digital values so as to provide the digital value corresponding to the ratio of the voltage of the current.

5. A shutdown control circuit for a constant-voltage supply having an output terminal connected to a load circuit having an input resistance which varies, comprising:

voltage detecting means for detecting the voltage at the output terminal of the constant-voltage supply;

current detecting means for detecting the current flowing through the constant-voltage supply; and signal generating means for generating a signal for shutting down the constant-voltage supply when a condition exists where the detected voltage is greater than a first predetermined voltage or when a condition exists where the detected voltage is less than a second predetermined voltage and the detected current is greater than a predetermined current, the first predetermined voltage being greater than the second predetermined voltage, the second predetermined voltage and the predetermined current being set so that the ratio thereof corresponds to the input resistance of the load circuit at which the supply of voltage from the constant-voltage supply is shut down;

said voltage detecting means comprising a voltage detecting circuit for detecting the voltage at the output terminal, said voltage detecting circuit having a first output for providing a high level output signal when the voltage is less than the second predetermined voltage and having a second output for providing a high level output signal when the voltage is greater than the first predetermined voltage;

said current detecting means comprising a current detecting circuit for detecting the current flowing through the output terminal, said current detecting circuit having an output and providing a high level output signal at the output when the current is greater than the predetermined current; and said signal generating means comrpising an OR gate having first and second inputs and an AND gate having two inputs connected to the first output of said voltage detecting circuit and the output of said current detecting circuit, respectively, and having an output for providing a high level output signal upon receiving the high level output signals from the first output of said voltage detecting circuit and said current detecting circuit, the first input of said OR gate being connected to the output of said AND gate and the second input of said OR gate being connected to the second output of said voltage detecting circuit, said OR gate for providing a shutdown signal for the constant-volatage supply upon receiving the high level output signal from said AND gate or the high level output signal at the second output of said voltage detecting circuit.

6. A shutdown control circuit for a constant-voltage supply having an output terminal connected to a load circuit having an input resistance, comprising:

detecting means for detecting the value of the input resistance and the voltage at the output terminal of the cosntant-voltage supply; and signal generating means for generating a signal for shutting down the constant-voltage supply when the input resistance is less than a predetermined resistance value or when the detected voltage is greater than a predetermined voltage value;

said detecting means including:

a voltage detecting circuit for detecting the voltage at the output terminal of the constant-voltage supply, said voltage detecting circuit having a first output for providing a first output signal corresponding to the detected voltage at the output terminal of the constant-voltage supply and having a second output for providing a second output signal upon detecting that the voltage at the output terminal of the constant-voltage supply is greater than the predetermined voltage value; and a current detecting circuit for detecting the current flowing through the output terminal of the constant-voltage supply, said current detecting circuit having an output and providing an output signal corresponding to the detected current at the output terminal of the constant-voltage supply; and said signal generating means including:

arithmetic operation means for processing the output signals at the first output of said voltage detecting circuit and the output of said current detecting circuit so as to provide a ratio of the voltage to the current, said arithmetic operation means providing a high level output signal when the ratio of the voltage to the current is less than the predetermined resistance value at which feeding of the power from the constant-voltage supply is shut down; and an OR gate having a first input connected to said arithmetic operation means and having a second input connected to the second output of said voltage detecting circuit, said OR gate providing the shutdown signal upon receiving the high level output signal from said arithmetic means or the second output signal at the second output of said voltage detecting circuit.

7. A shutdown control circuit as set forth in claim 6, wherein said voltage and current detecting circuits include means for providing digital values corresponding to the voltage and the current, respectively, and wherein said arithmetic operation means includes means for processing the digital values to provide the ratio of the voltage to the current.

8. A shutdown control circuit as set forth in claim 6, wherein said arithmetic operation means includes:

first means for providing digital values corresponding to the first output signal from said voltage detecting circuit and the output signal from said current detecting circuit, respectively; and second means for processing the digital values to provide the digital value corresponding to the ratio of the voltage to the current.

9. A shutdown control circuit for a constant-current supply having an output terminal connected to a load circuit having an input resistance, comprising:

voltage detecting means for detecting the voltage at the output terminal of the constant-current supply;

current detecting means for detecting the current flowing through the constant-current supply; and signal generating means for generating a signal for shutting down the constant-current supply when a condition exists where the detected voltage is greater than a first predetermined value and the detected current is less than a second predetermined value, or when a condition exists where the detected current is greater than a maximum value, the first and second predetermined values being determined so that the ratio of the first and second predetermined values corresponds to the input resistance of the load circuit at which the supply of current from the constant-current supply is shut down;

said voltage detecting means comprising a voltage detecting circuit, coupled to the output terminal of the constant-current supply, for detecting the voltage at the output terminal of the constant-current supply, said voltage detecting circuit having an output and providing a high level output signal at the output when the detected voltage is greater than the first predetermined value;

said current detecting means comprising a current detecting circuit, coupled to the output terminal of the constant-current supply, said current detecting circuit having a first output for providing a high level output signal when the current is less than the second predetermined value and having a second output for providing a high level output signal when the current is greater than the maximum value; and said signal generating means comprising an OR gate having first and second inputs and an AND gate having two inputs connected to the output of said voltage detecting circuit and the first output of said current detecting circuit, respectively, and having an output for providing a high level output signal upon receiving the respective high level output signals from said voltage detecting circuit and the first output of said current detecting circuit, the first input of said OR gate being connected to the output of said AND gate, the second input of said OR gate being connected to the second output of said current detecting circuit, said OR gate providing the shutdown signal for the constant-current supply upon receiving the high level output signal from said AND gate or the high level output signal from the second output of said current detecting circuit.

10. A shutdown control circuit for a constant-voltage supply having an output terminal connected to a load circuit having an input resistance, comprising:

voltage detecting means for detecting the voltage at the output terminal of the constant-voltage supply;

current detecting means for detecting the current flowing through the constant-voltage supply; and signal generating means for generating a signal for shutting down the constant-voltage supply when a condition exists where the detected current is greater than a first predetermined value and the detected voltage is less than a second predetermined value, or when a condition exists where the detected voltage is greater than a maximum value, the first and second predetermined values being determined so that the ratio of the first and second predetermined values corresponds to the input resistances of the load circuit at which the supply of voltage from the constant-voltage supply is shut down;

said voltage detecting means comprising a voltage detecting circuit, coupled to the output terminal of the constant-voltage supply, for detecting the voltage at the output terminal, said voltage detecting circuit having a first output for providing a high level output signal when the voltage is less than the second predetermined value and having a second output for providing a high level output signal when the voltage is greater than the maximum value;

said current detecting means comprising a current detecting circuit, coupled to the output terminal of the constant-voltage supply, for detecting the current flowing through the output terminal, said current detecting circuit having an output and providing a high level output signal at the output when the current is greater than the first predetermined values; and said signal generating means comprising an OR gate having first and second inputs and an AND gate having two inputs connected to the first output of said voltage detecting circuit and the output of said current detecting circuit, respectively, and having an output for providing a high level output signal upon receiving the high level output signals from the first output of said voltage detecting circuit and the output of said current detecting circuit, the first input of said OR gate being connected to the output of said AND gate, the second input of said OR gate being connected to the second output of said voltage detecting circuit, said OR gate for providing the shutdown signal for the constant-voltage supply upon receiving the high level output signal from said AND gate or the high level output signal at the second output of said voltage detecting circuit.

11. A shutdown control circuit for a constant-current supply having an output terminal connected to a load circuit having an input resistance which varies, comprising:

a voltage detection circuit, coupled to the output terminal, for detecting the voltage at the output terminal of the constant-current supply, and for outputting a first signal when the detected voltage is greater than a predetermined voltage value;

a current detection circuit, coupled to the constant-current supply, for detecting the current flowing through the constant-current supply, and for outputting a second signal when the detected current is less than a first predetermined current value and a third signal when the detected current is greater than a second predetermined current value; and a shutdown signal generator, coupled to said voltage detection circuit and said current detection circuit, for receiving said first, second and third signals, for outputting a shutdown signal when the third signal is detected, and for outputting the shutdown signal when the first and second signals are detected, the second predetermined current value corresponding to a desired current-voltage characteristic of the constant-current supply and being greater than the first predetermined current value, the predetermined voltage value and the first predetermined current value being determined by both a maximum input resistance for the load current and the desired current-voltage characteristic of the constant-current supply.

12. A shutdown control circuit for a constant-current supply having an output terminal connected to a load circuit having an input resistance, comprising:

a voltage detecting circuit, coupled to the output terminal, for detecting the voltage at the output terminal of the constant-current supply, and for providing a first output signal corresponding to the detected voltage;

a current detecting circuit, coupled to the output terminal, for detecting the current flowing through the output terminal of the constant-current supply, for providing a second output signal corresponding to the detected current at the output terminal of the constant-current supply, and for providing a third output signal upon detecting that the current at the output terminal of the constant-current supply is greater than a predetermined current value;

arithmetic operation means for processing the first output signal of said voltage detecting circuit and the second output signal of said current detecting circuit to provide a ratio of the voltage to the current, and for outputting a fourth output signal when the ratio of the voltage to the current is greater than the resistance value at which feeding of power from the constant-current supply is shut down; and a gate circuit, connected to said arithmetic operation means and to said current detecting circuit, for receiving the third output signal, for providing a shutdown signal upon receiving said third output signal of said current detecting circuit, and for providing the shutdown signal when the fourth output signal is output by said arithmetic operation means, said resistance value being determined by both a maximum input resistance for the load circuit and a desired current-voltage characteristic of the constant-current supply.

13. A shutdown control circuit for a constant-voltage supply having an output terminal connected to a load circuit having an input resistance which varies, comprising:

a voltage detecting circuit, coupled to the output terminal, for detecting the voltage at the output terminal, for providing a first output signal when the detecting voltage is less than a first predetermined voltage, and for providing a second output signal when the detected voltage is greater than a second predetermined voltage;

a current detecting circuit, coupled to the output terminal, for detecting the current flowing through the output terminal, and for providing a third output signal when the current is greater than a predetermined current;

a shutdown signal generator, coupled to said voltage detecting circuit and said current detecting circuit, for receiving the first, second and third output signals, for outputting a shutdown signal when the second output signal is detected, and for outputting the shutdown signal when the first and third output signals are detected, the second predetermined voltage corresponding to a desired current-voltage characteristic of the constant-voltage supply and being greater than the first predetermined voltage, the first predetermined voltage and the predetermined current being determined by both a maximum input resistance for the load circuit and the desired current-voltage characteristic of the constant-voltage supply.

14. A shutdown control circuit for a constant-voltage supply having an output terminal connected to a load circuit having an input resistance, comprising:

a voltage detecting circuit, coupled to the output terminal, for detecting the voltage at the output terminal of the constant-voltage supply, for providing a first output signal corresponding to the detected voltage at the output terminal of the constant-voltage supply, and for providing a second output signal upon detecting that the voltage at the output terminal of the constant-voltage supply is greater than a predetermined voltage value;

a current detecting circuit, coupled to the output terminal, for detecting the current flowing through the output terminal of the constant-voltage supply, and for providing a third output signal corresponding to the detected current at the output terminal of the constant-voltage supply;

arithmetic operation means for processing the first and third output signals to provide a ratio of the detected voltage to the detected current, and for providing a fourth output signal when the ratio of the detected voltage to the detected current is less than a resistance value at which feeding of the power from the constant-voltage supply is shut down; and a gate circuit, coupled to said voltage detecting circuit and said arithmetic operation means, for providing a shutdown signal when the fourth output signal from said arithmetic means is received and for providing the shutdown signal when the second output signal of said voltage detecting circuit is received, the resistance value being determined by both the maximum input resistance for the load circuit and a desired current-voltage characteristic of the constant-voltage supply.

* * * * *

UNITED STATES PATENT AND TRADEMARK OFFICE

CERTIFICATE OF CORRECTION

PATENT NO. : 4,727,448

DATED : February 23, 1988

INVENTOR(S) : KEN HANYUDA ET AL.

It is certified that error appears in the above-identified patent and that said Letters Patent is hereby corrected as shown below:

Column 10, line 25, "21a" should be --2Ia--.

Signed and Sealed this

Twenty-sixth Day of July, 1988

*Attest:*

DONALD J. QUIGG

*Attesting Officer* *Commissioner of Patents and Trademarks*